US008116570B2

(12) United States Patent
Vukosavljevic et al.

(10) Patent No.: US 8,116,570 B2
(45) Date of Patent: Feb. 14, 2012

(54) USER INTERFACE FOR PROVIDING DIGITAL INK INPUT AND CORRECTING RECOGNITION ERRORS

(75) Inventors: Milan Vukosavljevic, Belgrade (RS); Bodin Dresevic, Belgrade (RS); Dejan Ivkovic, Belgrade (RS); Goran Predovic, Belgrade (RS)

(73) Assignee: Microsoft Corporation, Redmond, WA (US)

( * ) Notice: Subject to any disclaimer, the term of this patent is extended or adjusted under 35 U.S.C. 154(b) by 1176 days.

(21) Appl. No.: 11/788,180

(22) Filed: Apr. 19, 2007

(65) Prior Publication Data

US 2008/0260240 A1    Oct. 23, 2008

(51) Int. Cl.
*G06K 9/00* (2006.01)
(52) U.S. Cl. ......... 382/187; 382/186; 382/188; 382/189
(58) Field of Classification Search .................. 382/181, 382/187, 189, 100, 312, 325
See application file for complete search history.

(56) References Cited

U.S. PATENT DOCUMENTS

| 5,481,626 | A |   | 1/1996  | Matsubayashi |
| 5,544,260 | A |   | 8/1996  | Chefalas et al. |
| 5,566,248 | A |   | 10/1996 | Ulrich |
| 5,627,914 | A |   | 5/1997  | Pagallo |
| 5,710,832 | A | * | 1/1998  | Berman et al. ............ 382/189 |
| 6,167,411 | A |   | 12/2000 | Narayanaswamy |
| 6,771,266 | B2 |  | 8/2004  | Lui et al. |
| 7,057,615 | B2 |  | 6/2006  | Wang et al. |
| 7,181,068 | B2 |  | 2/2007  | Suzuki et al. |
| 2003/0016873 | A1 | * | 1/2003 | Nagel et al. ............ 382/228 |
| 2003/0071850 | A1 | * | 4/2003 | Geidl ............ 345/781 |
| 2003/0216913 | A1 | * | 11/2003 | Keely et al. ............ 704/235 |
| 2004/0054701 | A1 |  | 3/2004  | Garst |
| 2006/0001667 | A1 |  | 1/2006  | LaViola et al. |
| 2006/0005115 | A1 |  | 1/2006  | Ritter et al. |
| 2006/0062470 | A1 |  | 3/2006  | Zhu et al. |
| 2006/0066591 | A1 |  | 3/2006  | Marggraff et al. |

OTHER PUBLICATIONS

Shilman et al, "Recognition and Grouping of Handwritten Text in Diagrams and Equations", 2004, IWFHR, 569-574.*
Fujimoto, et al., "Infty Editor—A Mathematics Typesetting Tool with a Handwriting Interface and a Graphical Front-End to OpenXM Servers", http://www.inftyproject.org/suzukilabo/files/03_RIMS_Fujimoto_et_al.pdf.
Labahn, et al., "MathBrush: An Experimental Pen-Based Math System", Date: 2006, http://drops.dagstuhl.de/opus/volltexte/2006/773/pdf/06271.LabahnGeorge.Paper.773.pdf.

(Continued)

*Primary Examiner* — Brian Q Le
*Assistant Examiner* — Edward Park
(74) *Attorney, Agent, or Firm* — Capitol City TechLaw; Richard C. Irving

(57) ABSTRACT

In embodiments consistent with the subject matter of this disclosure, a user may input one or more strokes as digital ink to a processing device. The processing device may produce and present a recognition result, which may include a misrecognized portion. A user may indicate a desire to correct the misrecognized portion and may further select one or more strokes of the misrecognized portion. The processing device may then present the one or more recognition alternates corresponding to the selected one or more strokes of the misrecognized portion. In some embodiments, the processing device may permit a user to rewrite the selected one or more strokes of the misrecognized portion with newly entered digital ink. Features, such as, rewriting and correction of the input digital ink may be discoverable in some embodiments.

13 Claims, 11 Drawing Sheets

OTHER PUBLICATIONS

Shilman, et al., "Recognition and Grouping of Handwritten Text in Diagrams and Equations", http://research.microsoft.com/~viola/Pubs/DocExtract/groupingReco_DAS2004.pdf.

Smithies, et al.,"A Handwriting-Based Equation Editor", http://www.cs.queensu.ca/drl/ffes/papers/smithies_GI99.pdf.

Chilean Office Action for Chilean Patent Application No. 1088-2008, mailed Apr. 29, 2010 (corresponds to present U.S. Patent Application).

Minoru, Patent Abstracts of Japan, Publication No. 06-195519, Jul. 15, 1994.

Jutaro, Patent Abstracts of Japan, Publication No. 2002-207960, Jul. 26, 2002.

PCT/US2008/057322, International Search Report for PCT application corresponding to the present application.

* cited by examiner

USER INTERFACE FOR PROVIDING DIGITAL INK INPUT AND CORRECTING RECOGNITION ERRORS

BACKGROUND

Many state-of-the-art processing devices permit a user to provide input as digital ink. The digital ink may include one or more handwritten strokes, which a processing device may display as ink as the one or more handwritten strokes are input. A handwritten stroke may begin when a writing instrument lands on a writing surface, and may end when the writing instrument is lifted off the writing surface. The writing surface may include a display screen, which may further include a digitizer, and the writing instrument may be an electronic or non-electronic pen, a stylus, a user's own finger, a pointing device, such as, for example, a computer mouse, or another writing instrument.

A user may input one or more handwritten strokes, as digital ink, to form a two-dimensional structure. The two-dimensional structure may include a mathematical expression, a chemical formula, textual characters, numbers, or other two-dimensional structures.

Recognizers for recognizing a digital ink two-dimensional structure, such as, for example, a mathematical expression, may produce a recognition result having a misrecognized portion. The user may attempt to correct the misrecognized portion by selecting the misrecognized portion of the recognition result. In at least one existing recognizer, the user may attempt to correct a misrecognized character of the recognition result by selecting the digital ink corresponding to the misrecognized character. Selecting the misrecognized portion of the recognition result, or selecting the digital ink corresponding to the misrecognized character in the recognition result, may cause one or more alternates to be displayed. The user may select one of the one or more alternates, thereby causing the misrecognized character to be replaced with the selected one of the one or more alternates without re-recognizing the input digital ink. One existing recognizer permits the user to type a correct character from a keyboard when the correct character is not among the displayed one or more alternates.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In embodiments consistent with the subject matter of this disclosure, a user may input one or more handwritten strokes to a processing device as digital ink. The digital ink may form a chemical formula, textual input, numeric input, or another two-dimensional structure. The processing device may recognize the digital ink and may produce and present a recognition result. When the recognition result includes a misrecognized portion, the user may indicate a desire to make a correction. In one embodiment, the user may select a correction icon to indicate the desire to make a correction. After indicating the desire to make a correction, the user may select, via the processing device, one or more strokes of the misrecognized portion. The processing device may then present to the user one or more alternates, corresponding to the selected one or more strokes of the misrecognized portion. The input one or more handwritten strokes may be re-recognized in view of a selection of one of the one or more alternates.

In some embodiments consistent with the subject matter of this disclosure, after selecting the one or more strokes of the misrecognized portion, the user may rewrite the selected one or more strokes of the misrecognized portion. The processing device may then re-recognize the input one or more handwritten strokes in view of the rewrite.

Features, such as, for example, a correction feature for correcting a misrecognized portion of the one or more input handwritten strokes, or a rewrite feature for rewriting the one or more handwritten strokes, may be discoverable when a writing instrument hovers over an area of a display.

DRAWINGS

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Figure 1:
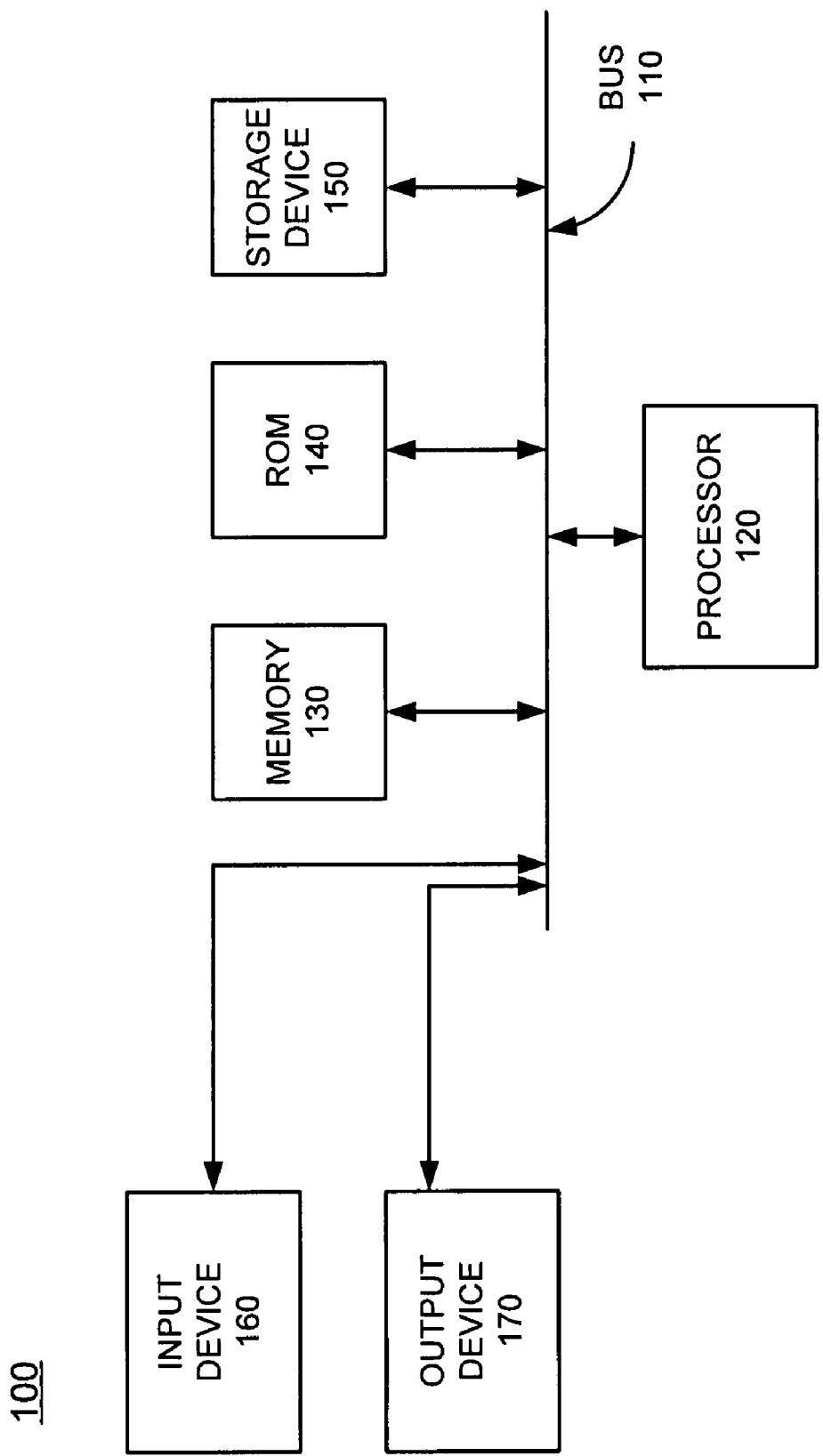
FIG. 1 is a functional block diagram illustrating an exemplary processing device, which may be used in implementations consistent with the subject matter of this disclosure.

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

Overview

In embodiments consistent with the subject matter of this disclosure, a user may input digital ink to a processing device. The digital ink may include one or more handwritten strokes forming a two-dimensional structure, which may include a mathematical expression, a chemical formula, textual input, numeric input, or another two-dimensional structure.

The processing device may process the input digital ink to produce a recognition result, which may be presented to the user. In one embodiment consistent with the subject matter of this disclosure, after each of the one or more handwritten strokes is written, the processing device may attempt to produce a recognition result, and if the recognition result is successfully produced, the processing device may present the recognition result to the user. Occasionally, the presented recognition result may include a misrecognized portion. A correction icon may be provided, such that the recognition result may be corrected. The correction icon may include a graphical symbol or text. When a device, such as, for example, a pointing device, an electronic or non-electronic pen, or other device, hovers slightly above the correction icon, a tooltip may be displayed indicating that the user may select the correction icon in order to select and correct misrecognized digital ink.

After selecting the correction icon, the user may select one or more strokes of the misrecognized digital ink, thereby causing the processing device to present one or more recognition alternates to the user. The processing device may have generated the one or more recognition alternates when the input digital ink was originally recognized.

In some embodiments consistent with the subject matter of this disclosure, the selected one or more strokes of the misrecognized digital ink need not be connected or contiguous. For example, the user may select strokes on opposite sides of a mathematical expression. In addition, the selected one or more strokes may be presented in a different color or shade than other strokes and/or may be surrounded by a rectangle or other shape.

Occasionally, a recognition alternate corresponding to a correct recognition of the misrecognized digital ink may not be presented to the user. In such a case, the user may rewrite the misrecognized digital ink. When a device, such as, for example, a pointing device, an electronic pen, or other device, hovers slightly above, or near, the selected one or more strokes of the misrecognized digital ink, a tooltip may be displayed indicating that the user may rewrite the selected one or more strokes of the misrecognized digital ink.

After selecting one of the one or more recognition alternates, or after rewriting the selected one or more strokes of the misrecognized digital ink, the input digital ink may be re-recognized taking into account the selected one of the one or more recognition alternates or the rewritten selected one or more strokes of the misrecognized digital ink.

Exemplary Processing Device

FIG. 1 is a functional block diagram that illustrates an exemplary processing device 100, which may be used to implement embodiments consistent with the subject matter of this disclosure. Processing device 100 may include a bus 110, a processor 120, a memory 130, a read only memory (ROM) 140, a storage device 150, an input device 160, an output device 170, and a communication interface 180. Bus 110 may permit communication among components of processing device 100.

Processor 120 may include at least one conventional processor or microprocessor that interprets and executes instructions. Memory 130 may be a random access memory (RAM) or another type of dynamic storage device that stores information and instructions for execution by processor 120. In one embodiment, memory 130 may include a flash RAM device. Memory 130 may also store temporary variables or other intermediate information used during execution of instructions by processor 120. ROM 140 may include a conventional ROM device or another type of static storage device that stores static information and instructions for processor 120. Storage device 150 may include any type of media for storing data and/or instructions.

Input device 160 may include a display or a touch screen, which may further include a digitizer, for receiving input from a writing device, such as, for example, an electronic or non-electronic pen, a stylus, a user's finger, or other writing device. In one embodiment, the writing device may include a pointing device, such as, for example, a computer mouse, or other pointing device. Output device 170 may include one or more conventional mechanisms that output information to the user, including one or more displays, or other output devices.

Processing device 100 may perform such functions in response to processor 120 executing sequences of instructions contained in a tangible machine-readable medium, such as, for example, memory 130, or other medium. Such instructions may be read into memory 130 from another machine-readable medium, such as storage device 150, or from a separate device via communication interface (not shown).

EXAMPLES

Figure 2A:
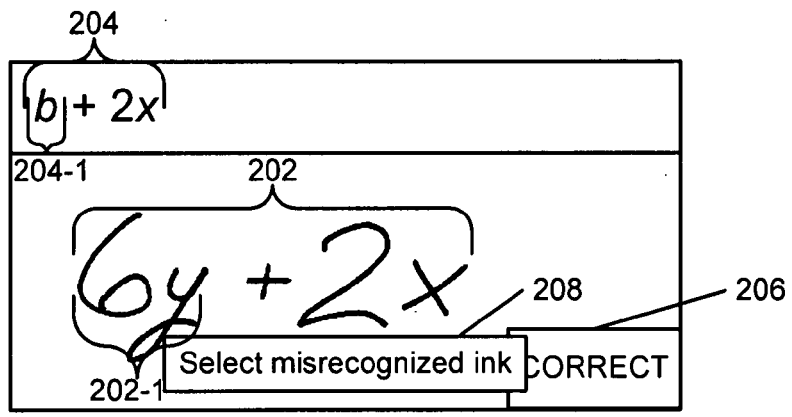
FIGS. 2A-5B illustrate exemplary displays showing examples in which recognition of input strokes forming digital ink may be corrected.

FIG. 2A illustrates an exemplary display of a processing device, such as, for example, processing device 100, after digital ink has been input. FIG. 2A shows digital ink 202, a recognition result 204 of recognizing digital ink 202, and a correction icon 206. In this example, digital ink 202 includes a mathematical expression. One may observe that strokes 202-1 were misrecognized as a character "b" 204-1. A user of the processing device may position a writing device or a pointing device, such that, the writing device or a pointer of the pointing device hovers above or near correction icon 206. When the processing device detects the writing device or the pointer of the pointing device hovering above or near correction icon 206, the processing device may display a message, or a tooltip 208 indicating that correction icon 206 may be used when selecting misrecognized digital ink. In some embodiments, the writing device may include an electronic or non-electronic pen, a stylus, a user's finger, or other writing device. The pointing device may include a computer mouse, a trackball device, or other pointing device.

Figure 2B:
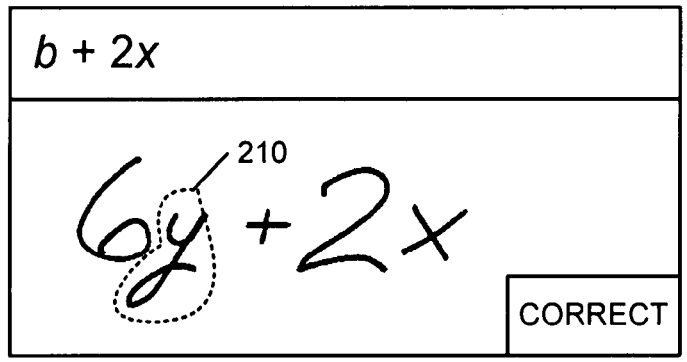

The user may select correction icon 206 by tapping correction icon 206 with the writing device or by clicking correction icon 206 using the pointing device, or by other methods. After selecting correction icon 206, processing device 100 may permit the user to select the misrecognized digital ink. In one embodiment, the user may select the misrecognized digital ink by using the writing device or the pointing device to draw a lasso 210 (FIG. 2B) with digital ink to encompass the misrecognized digital ink. In another embodiment, the user may select the misrecognized digital ink by tapping one or more strokes included in the misrecognized digital ink with the writing device, or by clicking on the one or more strokes included in the misrecognized digital ink using the pointing device. In a third embodiment, the user may select the one or more strokes of the misrecognized digital ink by drawing a stroke through the one or more strokes of the misrecognized digital ink. Numerous other methods may be employed to select the one or more strokes of the misrecognized digital ink in other embodiments consistent with the subject matter of this disclosure.

Figure 2C:
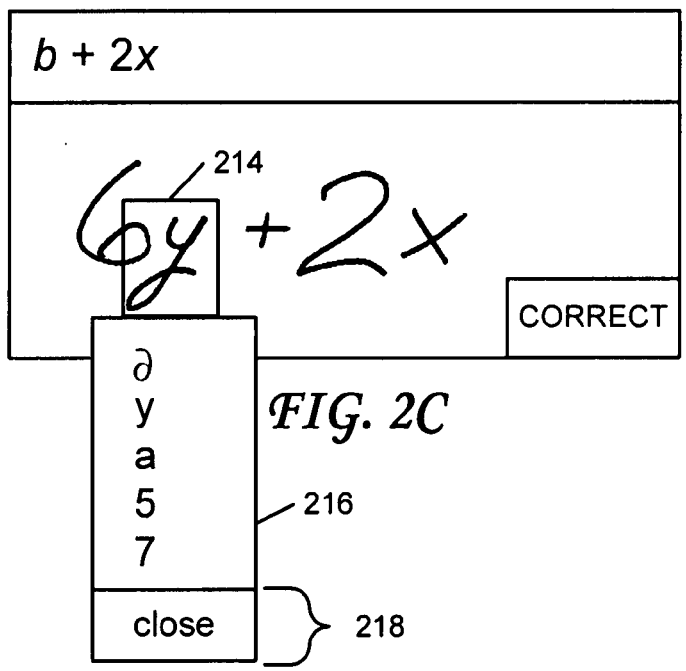

After selecting the one or more strokes of the misrecognized digital ink, a bounding box 214 (FIG. 2C) may be displayed surrounding the selected one or more strokes of the misrecognized digital ink. In other embodiments, a different shape may surround the selected one or more strokes. Further, the selected one or more strokes may be displayed in a different color or shade than other strokes. The processing device may display one or more alternate recognition results corresponding to the selected one or more strokes of the misrecognized digital ink. In one embodiment, the one or more alternate recognition results may be displayed in a submenu, which may include a pop-up menu 216. Pop-up menu 216 may also include a "close" icon 218, which the user may select to close pop-up menu 216.

Figure 2D:
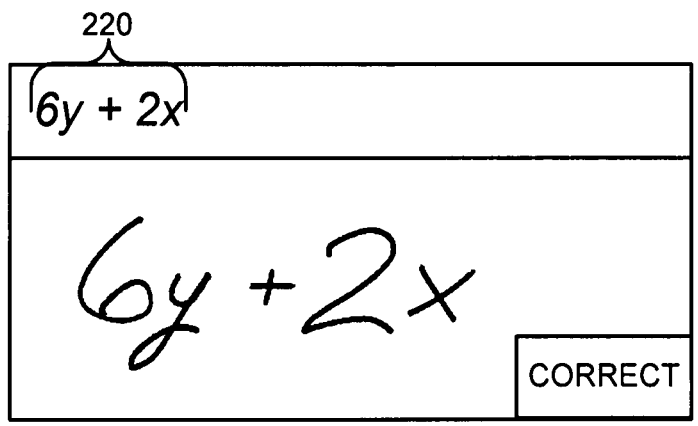

In this example, the user may select alternate recognition result "y", corresponding to a correct recognition result, from pop-up menu 216. As a result of the user selecting the alternate recognition result "y", the processing device may recognize the selected one or more strokes of the misrecognized digital ink as "y" and may further recognize other portions of the input digital ink, taking the selected alternate recognition result "y" into account. Thus, the processing device may then correctly recognize the input digital ink as "6y+2x" (FIG. 2D), as illustrated by corrected recognition result 220.

Figure 3A:
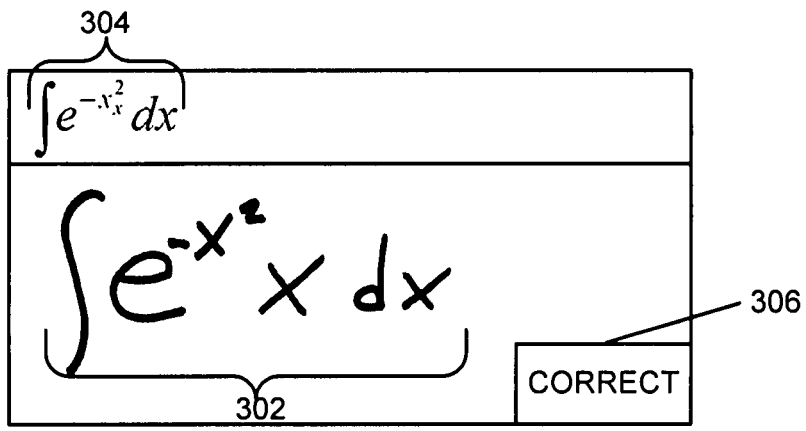
Figure 3B:
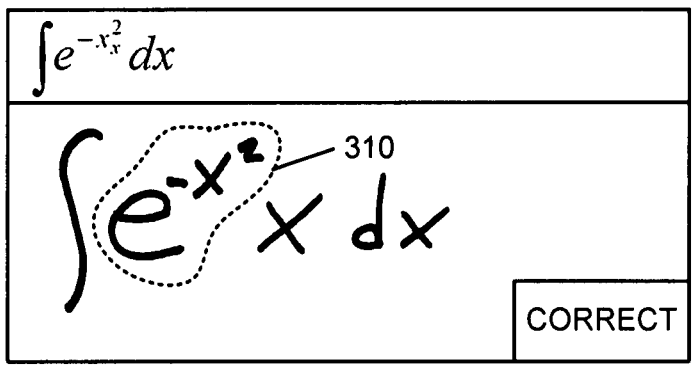
Figure 3C:
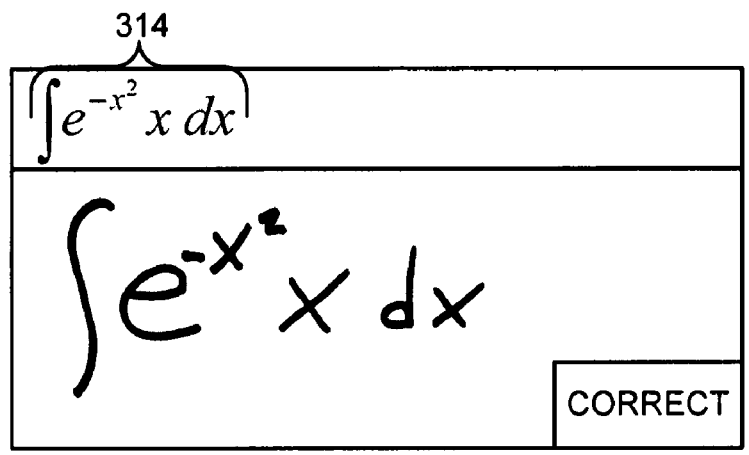

FIGS. 3A-3C illustrate another exemplary display including densely-written strokes of digital ink. As shown in FIG. 3A, a user may have entered densely-written strokes of digital ink 302 representing a mathematical expression. The processing device may recognize strokes of digital ink 302 and may display a recognition result 304 having one or more misrecognized portions. As can be seen in FIG. 3A, strokes of digital ink 302, representing "x", were misrecognized as a subscript of strokes of digital ink 302 representing exponent "$-x^2$".

A subset of strokes may be recognized without using any information from remaining strokes of digital ink. We call this out-of context (or context-free) recognition. If at least one other stroke is used during recognition, we call this in-context recognition.

In this example, the user may select a correction icon 306, to indicate that misrecognized strokes are to be selected. After selecting correction icon 306, the user may select the misrecognized strokes using any of the methods discussed previously, or other methods. In the example of FIG. 3B, the user drew digital ink, which may include a lasso 310, surrounding one or more misrecognized strokes. The processing device may then recognize the selected misrecognized one or more strokes out-of-context (or context-free) and may then re-recognize at least a portion of remaining strokes of the input digital ink 302, taking into account the context-free recognition result of the selected one or more misrecognized strokes. As shown in FIG. 3C, the processing device may then correctly recognize the input digital ink and may display a correct recognized result 314.

Context-free recognition may not always produce a correct recognition result. For example, suppose a user inputs digital ink corresponding to a mathematical expression, "(x+y)". If the user selects strokes representing "(x+", then a context-free recognition of the strokes may produce an incorrect recognition result, "Lxt".

In some embodiments consistent with the subject matter of this disclosure, after a user selects misrecognized strokes, the processing device may perform a context-free recognition of the misrecognized strokes to produce one or more context-free recognition alternates and the processing device may further perform an in-context recognition of the misrecognized strokes to produce one or more in-context recognition alternates. The processing device may then form a union of the one or more context-free recognition alternates and the one or more in-context recognition alternates. The union may be presented to the user in a submenu, such as a pop-up menu, from which the user may select an alternate from the union corresponding to a correct recognition result.

In some embodiments, consistent with the subject matter of this disclosure, a multiple-level menu of recognition alternates may be presented to the user when the user attempts to correct misrecognized ink. FIGS. 4A-4D illustrate an example in which a multiple-level menu is presented to the user.

Figure 4A:
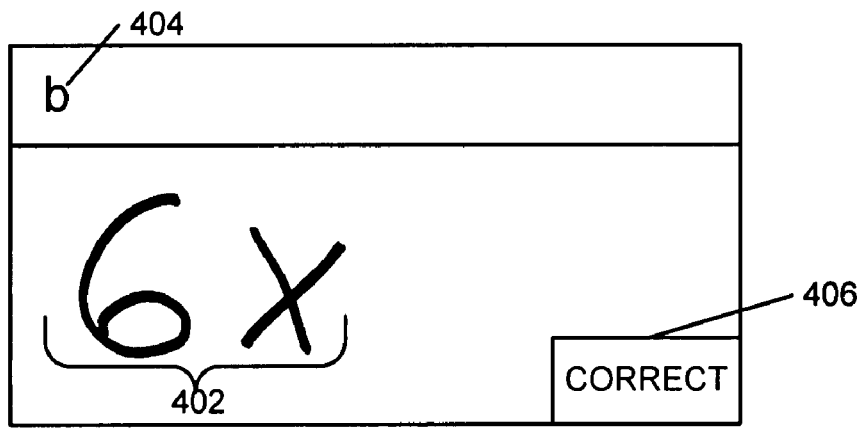

FIG. 4A illustrates strokes 402 input to a processing device as digital ink and displayed to the user. The processing device may recognize the input digital ink and may present recognition result 404. As can be seen in FIG. 4A, recognition result 404 is incorrect.

Figure 4B:
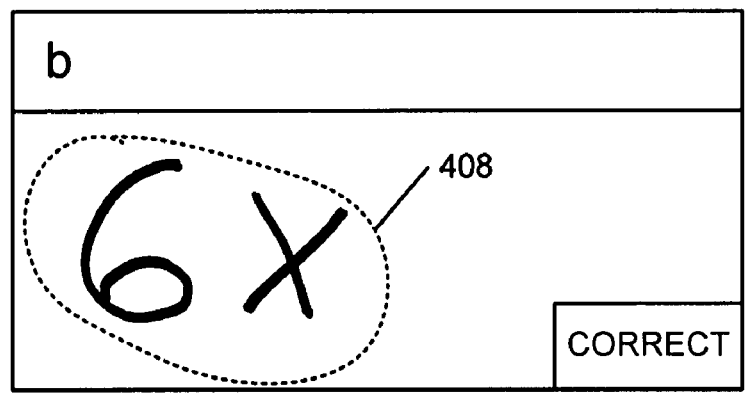
Figure 4C:
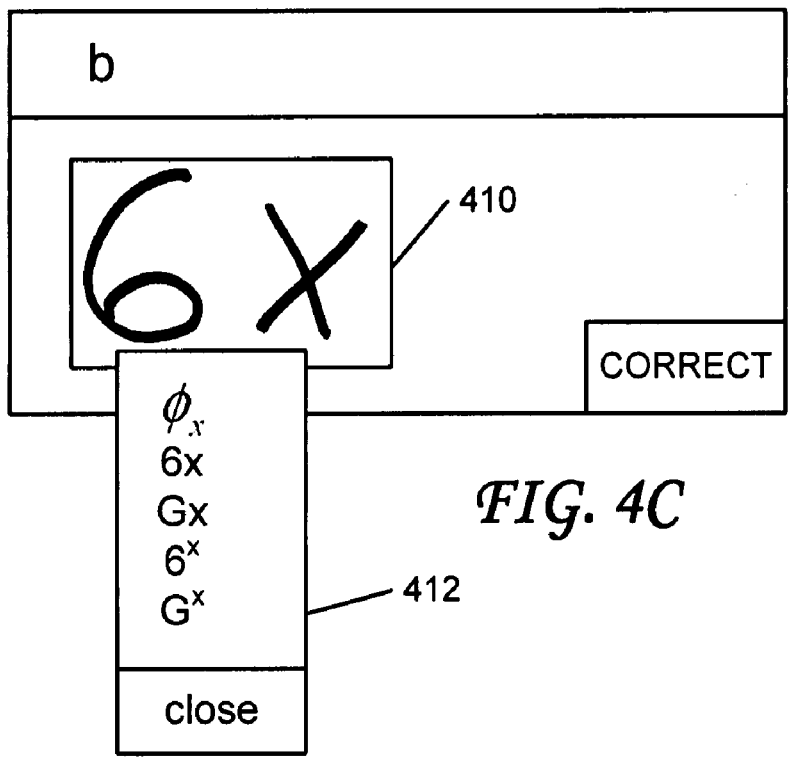

The user may indicate a desire to correct misrecognized strokes by selecting correction icon 406, as previously discussed. After selecting correction icon 406, the user may select misrecognized strokes of strokes 402 by any of the methods previously discussed, or by other methods. In this example, the user may select the misrecognized strokes by lassoing, or writing digital ink to encircle the misrecognized strokes. In FIG. 4B, the digital ink encircling the misrecognized strokes is shown as a dotted line 408.

After selecting the misrecognized strokes, the processing device may display a bounding box 410 (FIG. 4C) or another shape around the selected misrecognized strokes and the processing device may further display a submenu, such as, for example, a pop-up menu 412, including one or more recognition alternates.

In one embodiment, the processing device may have previously generated the recognition alternates when originally recognizing strokes 402. Each recognition alternate may have a score. Recognition alternates with higher scores may be considered to be more likely correct than recognition alternates with lower scores. The recognition alternates may be sorted based on their respective scores and N top recognition alternates, such as, for example, 5 top recognition alternates, or another number of recognition alternates, may be presented.

In another embodiment, the processing device may generate recognition alternates by performing in-context recognition and out-of-context recognition. As mentioned above, each of the generated recognition alternates may have a score. Recognition alternates with higher scores may be considered better than recognition alternates with lower scores. The processing device may sort the recognition alternates based on their respective scores. A top N recognition alternates, such as, for example, 5 recognition alternates, or another number of recognition alternates, with different structures may be displayed in pop-up menu 412. For example, a recognition alternate may be structured as a variable name with a subscript, as a numeric value with a subscript, as a numeric value multiplied by a variable, or as any one of a number of other variations.

Pop-up menu 412 may also include a close indication, selection of which may cause pop-up menu 412 to close.

Figure 4D:
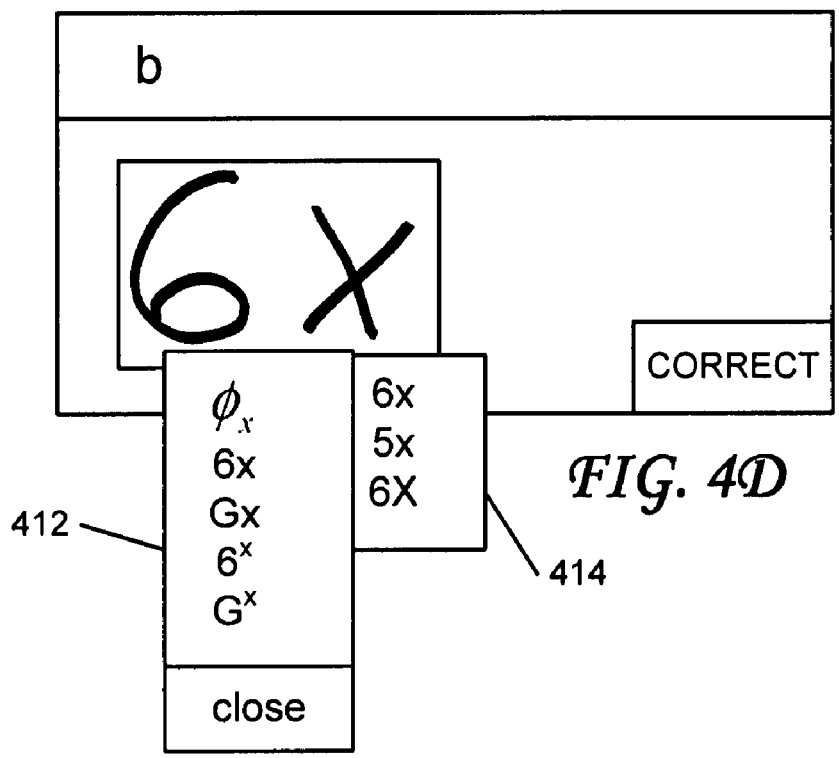

FIG. 4D illustrates a second pop-up menu 414, which may be displayed as a submenu when a recognition alternate is selected from pop-up menu 412. In this example, it is assumed that the user selected "6x" from pop-up menu 412. As a result of receiving the user's selection of "6x" from pop-up menu 412, the processing device may display a submenu, which, in this case may be second level pop-up menu 414. Note, that the selection "6x" has a structure including a numeric value multiplied by a variable. Pop-up menu 414 may include one or more recognition alternates having a same structure as the selected recognition alternate of pop-up menu 412. That is, the one or more recognition alternates of pop-up menu 414, in this example, are structured as a numeric value multiplied by a variable.

Figure 5A:
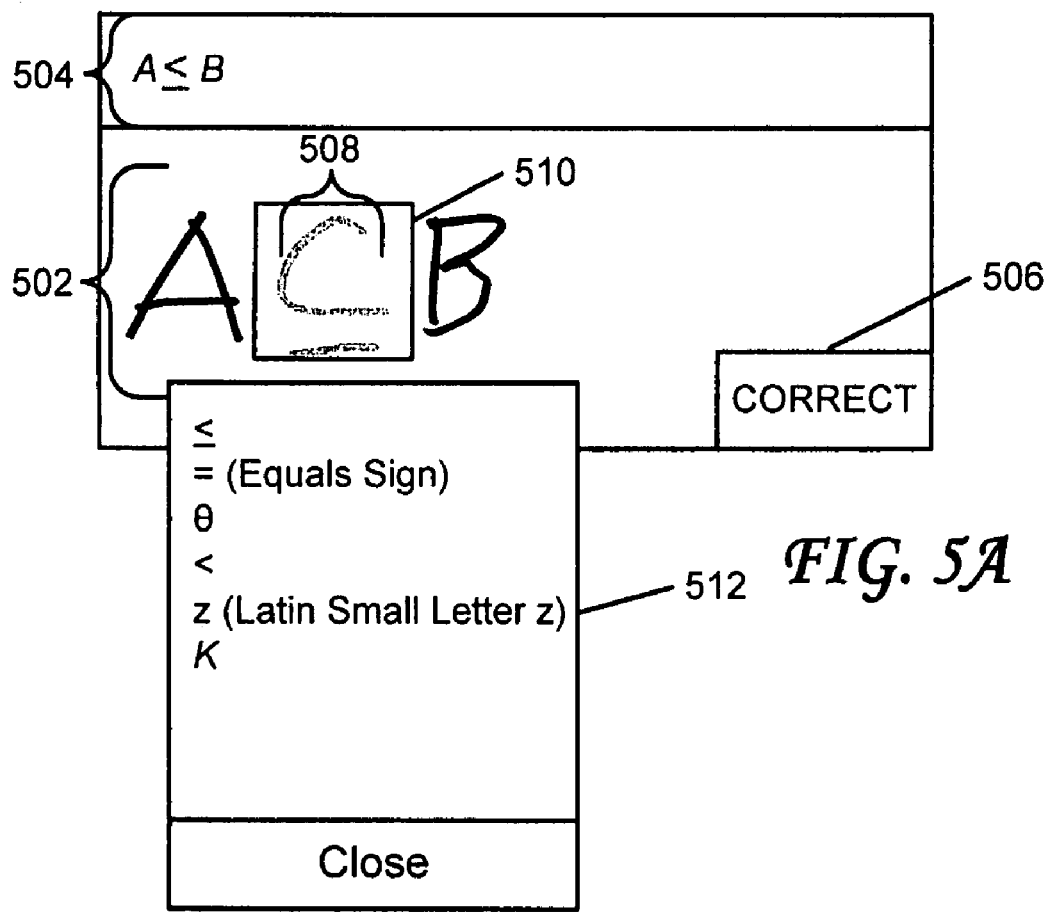
Figure 5B:
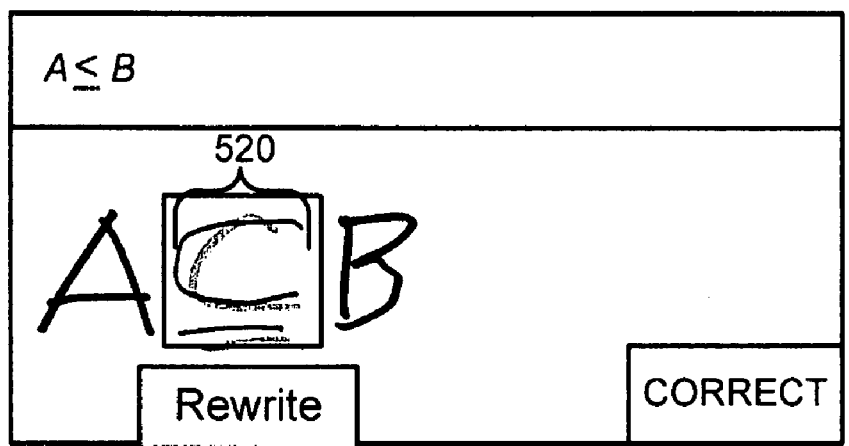

FIGS. 5A-5B illustrate a rewrite feature, which may be implemented in embodiments consistent with the subject matter of this disclosure. In FIG. 5A, user input digital ink 502 represents a mathematical expression, $A \subset B$. A processing device may recognize input digital ink 502 and may display a recognition result 504. Note, that at least a portion of the displayed recognition result 504 is incorrect. That is, strokes 508 representing $\subset$ were misrecognized as $\subseteq$.

The user may attempt to correct misrecognized strokes 508 by selecting correction icon 506 and further selecting misrecognized strokes 508 via any of the previously discussed methods, or any other method. For example, the user may use digital ink to draw a line encircling misrecognized strokes 508. The processing device may then display a bounding box 510, or another shape around misrecognized strokes 508, and may further display a submenu, such as, for example, a pop-up menu 512 including one or more recognition alternates. The one or more recognition alternates may have been generated when the processing device originally attempted to recognize input digital ink 502, or the one or more alternates may be generated by performing recognition of the selected strokes in-context and out-of context and selecting a top N recognition alternates that are most likely to be correct, where N may be 5 or some other number. In addition, selected misrecognized strokes 508 may be displayed differently than a remainder of input digital ink 502. In one embodiment, selected misrecognized strokes 508 may be displayed using digital ink having a lighter shade than other displayed digital ink. In other embodiments, selected misrecognized strokes 508 may be displayed using digital ink of a different color than the other displayed digital ink. Further, a portion of recognition result 504, corresponding to selected misrecognized strokes 508 may be displayed using the lighter shade or digital ink of the different color.

In this example, pop-up menu 512 does not include a correct recognition alternate. In some embodiments, the user may discover a rewrite function, when a writing instrument, such as, for example, an electronic or non-electronic pen, a stylus, a pointer of a pointing device, or other writing instrument, hovers over a portion of input digital ink 502. When the processing device detects the writing instrument or the pointer hovering over the portion of input digital ink 502, a tooltip 514 (FIG. 5B) may be presented informing the user of a rewrite function. Instead of selecting a recognition alternate from pop-up menu 512, the user may rewrite misrecognized strokes 508 by simply using the writing instrument or the pointing device to write in an area of bounding box 510. Newly input digital ink 520 (FIG. 5B) may be displayed by the processing device using a shade of digital ink different from the shade of misrecognized strokes 508. In one embodiment, newly input digital ink 520 may be a darker shade than that used by the processing device to display the misrecognized strokes 508. In other embodiments, newly input digital ink 520 may be of a different color than a color of other displayed digital ink.

Exemplary Processing

Figure 6:
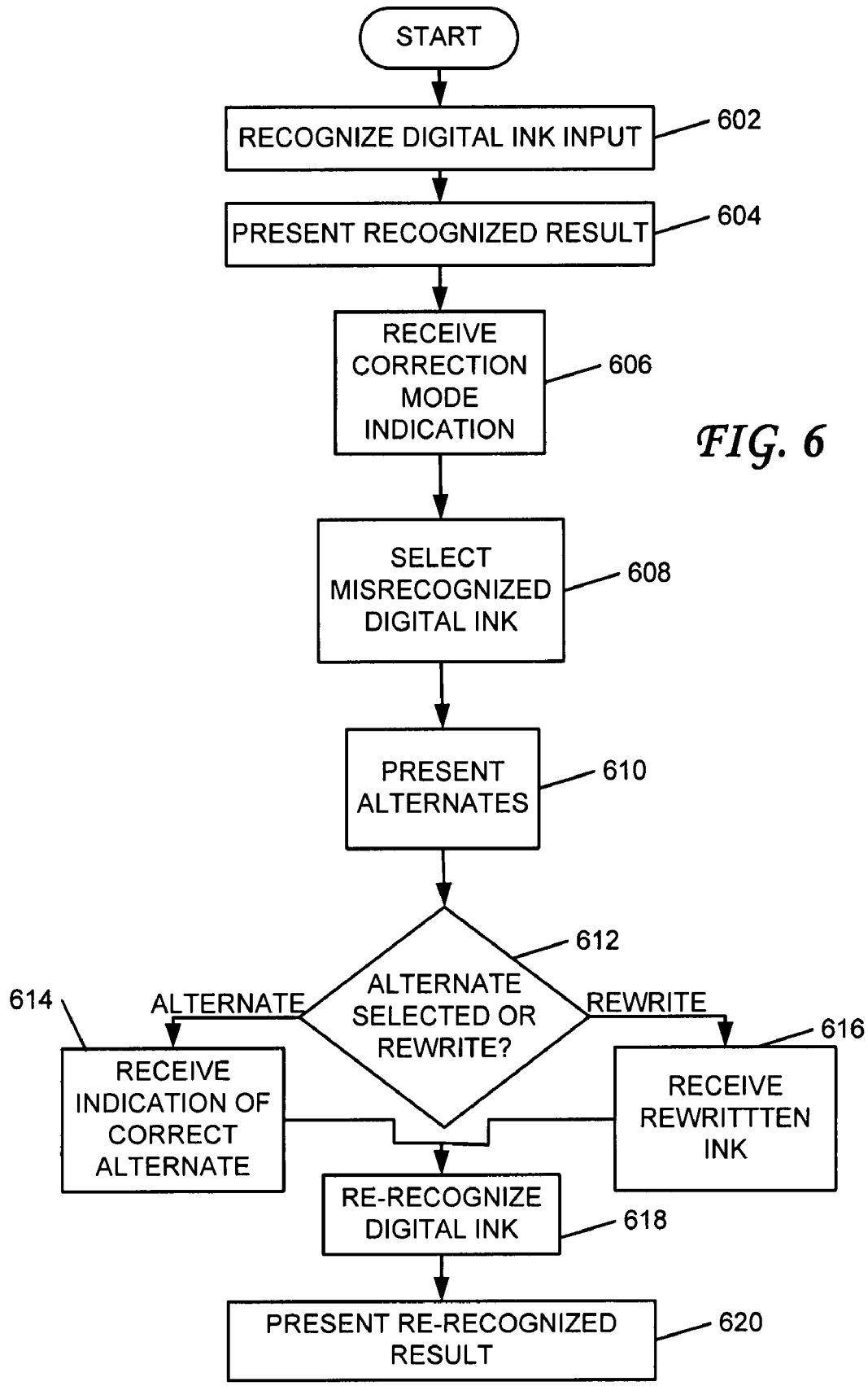
FIG. 6 is a flowchart of an exemplary process for identifying and correcting misrecognized digital ink.

FIG. 6 is a flowchart illustrating an exemplary process, which may be implemented in embodiments consistent with the subject matter of this disclosure. The process may start with a processing device, such as, for example, processing device 100, recognizing digital ink input via a writing device or a pointing device and an input device, such as, for example, a display device, a touch screen with a digitizer, or other input device (act 602). The processing device may then present a recognition result, in real time, based on the digital ink input (act 604). The presented recognition result may include a recognition error. In one embodiment consistent with the subject matter of this disclosure, after each of the one or more handwritten strokes is written, the processing device may attempt to produce a recognition result, and if the recognition result is successfully produced, the processing device may present the recognition result to the user.

The processing device may receive an indication that a correction mode is to be entered (act 606). In one embodiment, the indication may be received as a result of a selection of a displayed correction icon. In other embodiments, the indication that may be provided to the processing device via other methods.

After receiving the indication, the processing device may then receive a selection indicating one or more misrecognized strokes of digital ink (act 608). The processing device may then display a menu or submenu having one or more recognition alternates with respect to the selected misrecognized digital ink (act 610). In some embodiments, the one or more recognition alternates may have been previously determined at a time when the processing device originally recognized the digital ink input. In other embodiments, the processing device may re-recognize the selected misrecognized digital ink out-of-context and in-context with respect to a remainder of the digital ink input, as explained below with respect to FIG. 8.

A correct recognition alternate may be selected from the displayed menu or submenu, which may be a pop-up menu, or the misrecognized digital ink may be rewritten (act 612). If a correct recognition alternate is provided, then the processing device may receive an indication of the correct recognition alternate as a result of a user's selection (act 614). If the misrecognized digital ink is rewritten, then the processing device may receive and display the rewritten digital ink (act 616). The processing device may re-recognize, in real time, the digital ink input in view of the selected recognition alternate or the rewritten digital ink (act 618) and may present a re-recognized result (act 620). The re-recognized result may be displayed on a display screen.

Figure 7:
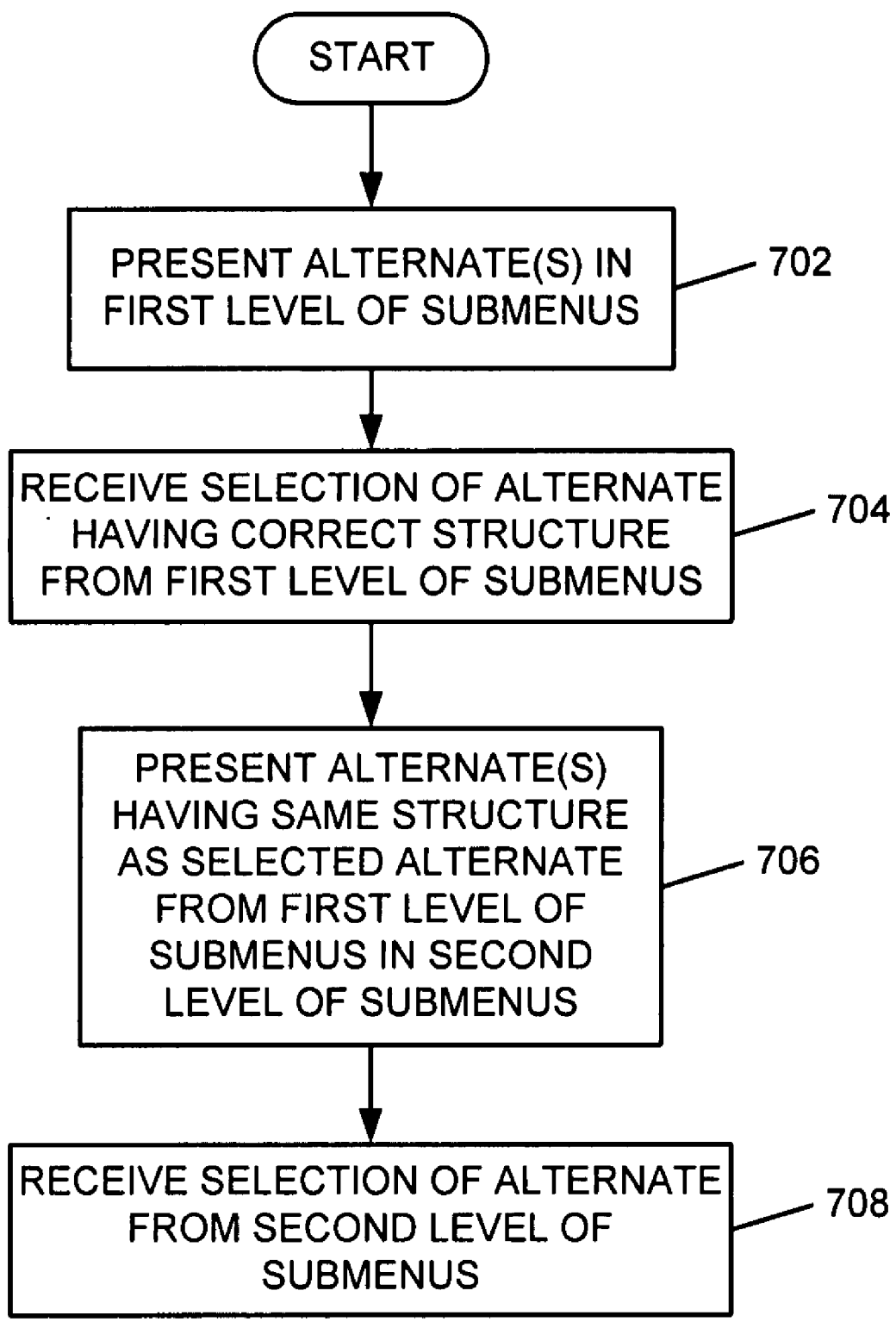
FIG. 7 is a flowchart of an exemplary process for presenting multiple levels of menus, including recognition alternates, during a correction process.

FIG. 7 is a flowchart illustrating an exemplary process, which may be performed in embodiments consistent with the subject matter of this disclosure. In some embodiments, the exemplary process of FIG. 7 may replace acts 610 and 614 of FIG. 6. For example, after a user selects strokes of misrecognized digital ink (act 608; FIG. 6), the processing device may present one or more recognition alternates in a first level of a group of submenus, which may include a pop-up menu (act 702). The one or more recognition alternates in the first level of the group of submenus may include recognition alternates having different structures, such as different combinations of numbers, variables, and mathematical operators. The processing device may receive a selection of one of the one or more recognition alternates having a correct structure from the first level of the group of submenus (act 704). The processing device may then present a second level of the group of submenus including one or more recognition alternates having a same structure as the selected one of the one or more recognition alternates from the first level of the group of submenus (act 706). The processing device may then receive a selection of a correct recognition alternate from the second level of the group of submenus (act 708). The processing device may then re-recognize the digital ink input (act 618; FIG. 6) and a new recognition result may be presented (act 620; FIG. 6).

Figure 8:
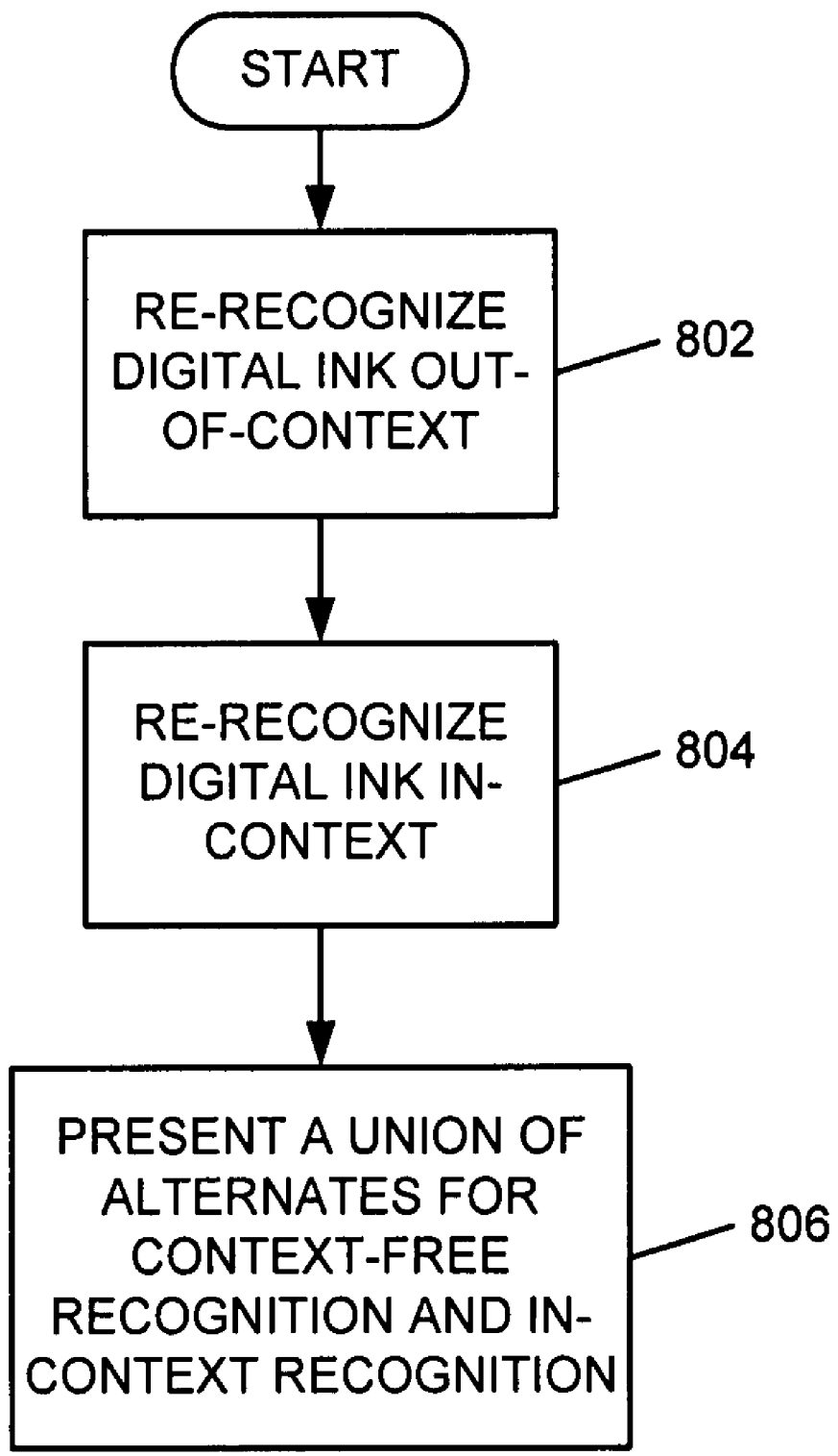
FIG. 8 is a flowchart of an exemplary process for generating one or more recognition alternates in one embodiment consistent with the subject matter of this disclosure.

FIG. 8 illustrates a flowchart of an exemplary process, which may be performed in embodiments consistent with the subject matter of this disclosure. The exemplary process of FIG. 8 may be performed by a processing device, such as, for example, processing device 100, after misrecognized digital ink is selected. For example, when misrecognized digital ink is selected, the processing device may re-recognize the selected misrecognized digital ink out-of-context (context-free) and may produce one or more context-free recognition alternates (act 802). The processing device may then re-recognize the selected misrecognized digital ink in-context with at least one stroke of a remainder of the input digital ink, taking into account a grouping of strokes of the selected misrecognized digital ink, and may produce one or more in-context recognition alternates (act 804). The processing device may then present a menu, such as, for example, a pop-up menu, which may include a union of the one or more context-free recognition alternates and the one or more in-context recognition alternates (act 806). The user may then select one of the presented alternates.

Growth Feature

Figure 9A:
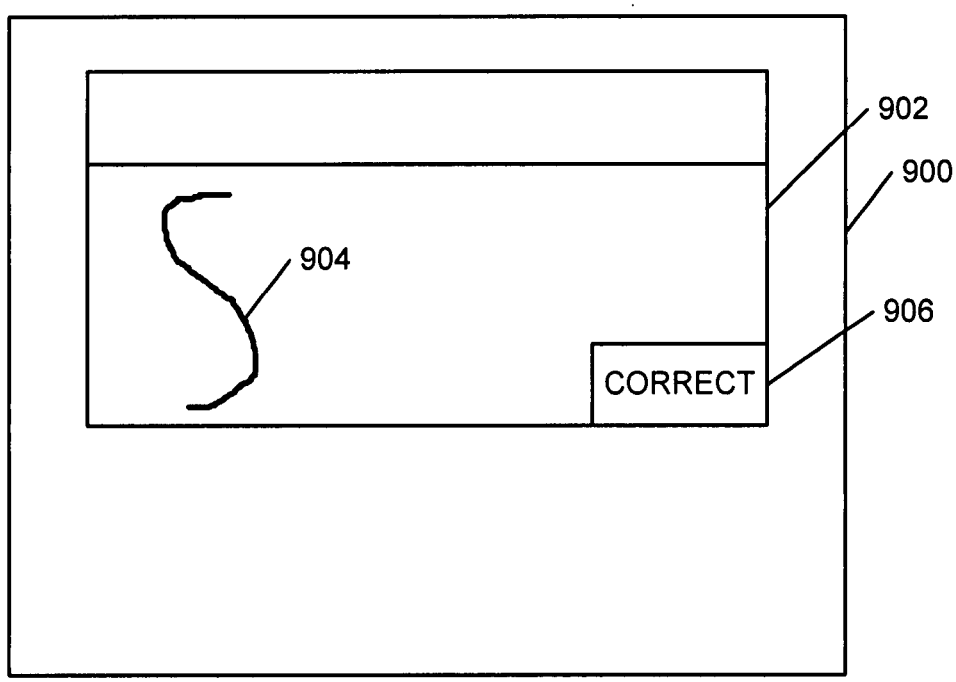
FIGS. 9A-9B illustrate a growth feature with respect to an ink input window implemented in some embodiments consistent with the subject matter of this disclosure.
Figure 9B:
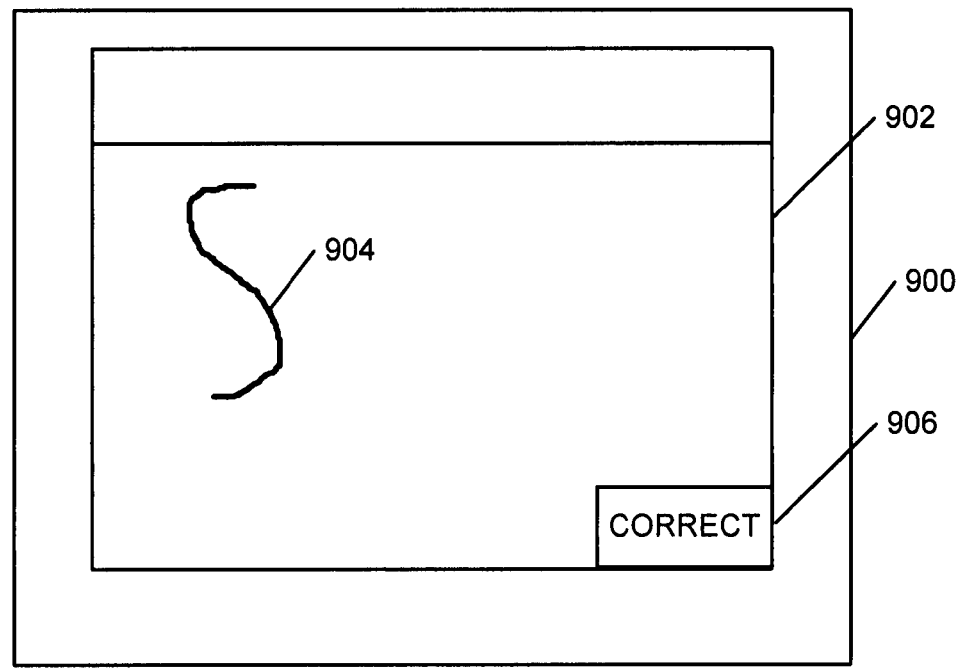

FIGS. 9A-9B illustrate a growth feature that may be implemented in some embodiments consistent with the subject matter of this disclosure. FIG. 9A shows an ink input window 902 displayed on a display screen 900 of a processing device, such as, for example, processing device 100. In an embodiment in which ink input window 902 may be used to input a mathematical expression as digital ink, as a stroke 904 is drawn and a portion of stroke 904 is in a vicinity of a bottom portion of ink input window 902, ink input window may grow towards a bottom of display screen 900, as shown in FIG. 9B. In addition, when ink input window 902 grows toward the bottom portion of display screen 900, correction icon 906 may be moved down, such that correction icon 906 continues to be located at a bottom portion of ink input window 902, in one embodiment. In another embodiment, correction icon 906 may not be moved down when ink input window 902 grows toward the bottom portion of display screen 900. When a stroke starts out at one portion of ink input window 902, but approaches a bottom portion of ink input window 902, ink input window 902 may grow toward the bottom portion of display screen 900 until a physical limit of display screen 900 is reached.

In another embodiment, if a stroke approaches an edge portion of ink input window 902, such as, for example, a top portion, a left portion, a bottom portion, or right portion of ink input window 902, ink input window 902 may grow toward a top portion, a left portion, a bottom portion, or a right portion of display screen 900, respectively, until a physical limit of display screen 900 is reached. In some embodiments, correction icon 906 may be moved in a direction of growth of ink input window 902. In other embodiments, correction icon may not be moved when ink input window 902 grows. In yet other embodiments, correction icon 906 may be moved in certain directions of growth of ink input window 906 and may not be moved when ink input window 902 grows in certain other directions.

Undo/Redo Feature

In some embodiments consistent with the subject matter of this disclosure, if the user is not satisfied with a recognition result after attempting to correct one or more misrecognized strokes of digital ink, the user may employ an undo feature to remove an effect from the attempt to correct the one or more misrecognized strokes of digital ink. Thus, a presented recognition result may roll back to a previously presented recognition result when the undo feature is employed. In one embodiment, the undo feature may be implemented by storing information with respect to recognition results when attempts are made to correct misrecognized strokes. For example, a processing device, such as, for example, processing device 100, may store information with respect to a last N attempts to correct misrecognized strokes of digital ink, where N may be 5, 10, or another value. Thus, the user may undo, or rollback results of up to N attempts to correct misrecognized strokes of digital ink and may correct the misrecognized strokes of digital ink by selecting one or more other strokes of the misrecognized digital ink to cause one or more other recognition alternates to be presented for selection, by rewriting the selected one or more strokes of the misrecognized digital ink, or via other methods.

Figure 10:
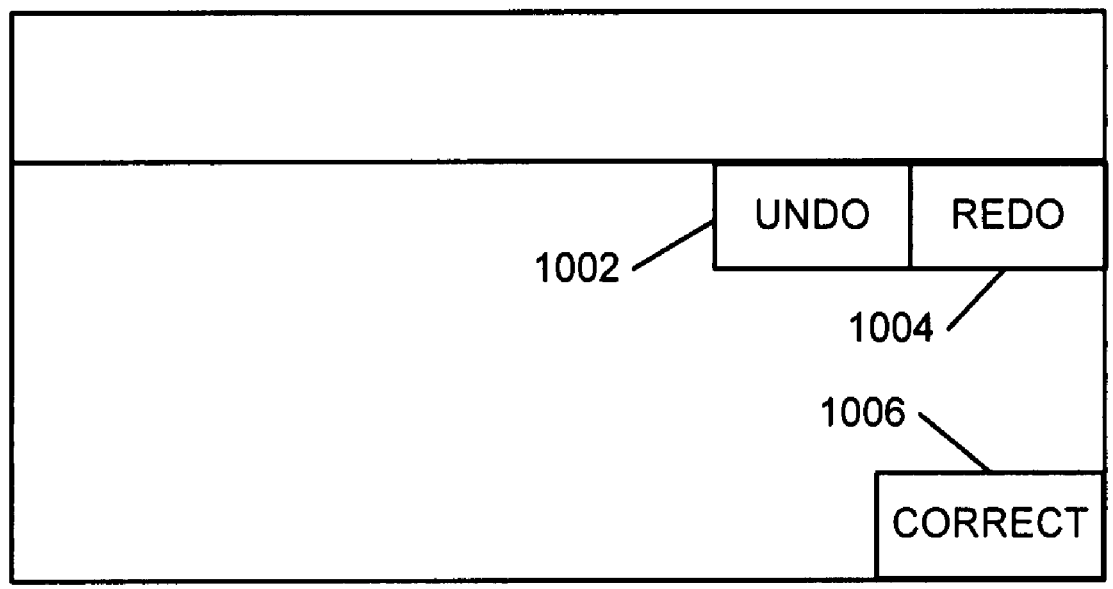
FIG. 10 illustrates an exemplary display having an undo icon for undoing an effect of an attempt to correct misrecognized strokes of digital ink.

FIG. 10 illustrates an exemplary display having an undo icon 1002, a redo icon 1004, and a correction icon 1006. Correction icon 1006 may function as discussed previously, with respect to correcting misrecognized strokes of digital ink. A user may select undo icon 1002 to undo or rollback a result of attempting to correct misrecognized strokes of digital ink. The user may select undo icon 1002 multiple times to undo results of multiple attempts to correct misrecognized strokes of digital ink. The user may select redo icon 1004 to reapply one or more undone attempts to correct misrecognized strokes of digital ink.

CONCLUSION

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they should not be construed as limiting the claims in any way. Other configurations of the described embodiments are part of the scope of this disclosure. For example, although a single level menu of recognition alternates and a two-level menu of recognition alternates were described above as being presented to a user, many levels of menus or submenus of recognition alternates may be presented, such as three levels or more. Further, implementations consistent with the subject matter of this disclosure may have more or fewer acts than as described, or may implement acts in a different order than as shown. Accordingly, the appended claims and their legal equivalents should only define the invention, rather than any specific examples given.

We claim as our invention:

1. A processing device comprising:
   a processor;
   a memory;
   an input component;
   an output component; and
   a bus connecting the processor, the memory, the input component, and the output component, the memory comprising:
   instructions for recognizing a first plurality of strokes input as digital ink via the input component,
   instructions for presenting a recognition result of the recognizing of the first plurality of strokes of the digital ink, via the output component,
   instructions for permitting a user to select at least one of the first plurality of strokes corresponding to a misrecognized portion of a presented recognition result,
   instructions for permitting a user to rewrite, via the input component, the selected at least one of the plurality of strokes corresponding to the misrecognized portion of the presented recognition result,
   instructions for re-recognizing, in real time, at least a portion of the first plurality of strokes input as digital ink, taking into account a rewritten portion of the first plurality of strokes, to produce a new recognition result, such that an attempt is made to correct a second misrecognized portion of the presented result when the second misrecognized portion exists, the second misrecognized portion corresponding to at least one of the first plurality of strokes not selected as corresponding to the misrecognized portion of the presented result, and
   instructions for presenting the new recognition result, via the output component.

2. The processing device of claim 1, wherein the instructions for permitting a user to select at least one of the first plurality of strokes corresponding to a misrecognized portion of a presented recognition result further comprise:
  instructions for permitting the user to select the at least one of first the plurality of strokes corresponding to the misrecognized portion of the presented recognition result by drawing a lasso encompassing the at least one of the plurality of strokes.

3. The processing device of claim 1, wherein the instructions for permitting a user to select at least one of the first plurality of strokes corresponding to a misrecognized portion of a presented recognition result further comprise:
  instructions for permitting the user to select the at least one of the first plurality of strokes corresponding to the misrecognized portion of the presented recognition result by drawing a stroke through the at least one of the plurality of strokes.

4. The processing device of claim 1, wherein the memory further comprises:
  instructions for performing a context-free recognition of the at least one of the first plurality of strokes corresponding to the misrecognized portion of the presented recognition result to produce at least one first alternate recognition result,
  instructions for performing a recognition of the at least one of the first plurality of strokes corresponding to the misrecognized portion of the presented recognition result in context with at least one other stroke of the first plurality of strokes input as the digital ink to produce at least one second alternate recognition result, and
  instructions for presenting a plurality of alternate recognition results based on the plurality of alternate recognition results including the at least one first alternate recognition result and the at least one second alternate recognition result.

5. The processing device of claim 1, wherein the memory further comprises:
  instructions for presenting a menu of alternate recognition results when the user indicates a selection of at least one of the first plurality of strokes corresponding to the misrecognized portion of the presented recognition result.

6. The processing device of claim 1, wherein the memory further comprises:
  instructions for presenting a multilevel menu of alternate recognition results when the user indicates a selection of at least one of the first plurality of strokes corresponding to the misrecognized portion of the presented recognition result, wherein
  ones of the alternate recognition results presented in a second level of the multilevel menu have a same structure of a selected one of ones of the alternate recognition results presented in a first level of the multilevel menu.

7. A machine-readable storage device having stored therein instructions for at least one processor, the instructions comprising:
  instructions for recognizing a digital ink input representing one or more items of a two dimensional structure, the digital ink input including a first plurality of strokes;
  instructions for presenting a recognition result based on the recognizing of the digital ink input;
  instructions for receiving a selection indicating at least one of the first plurality of strokes corresponding to a misrecognized portion of the recognition result;
  instructions for making a rewriting feature discoverable, the rewriting feature being for permitting a user to rewrite the at least one of the first plurality of strokes corresponding to the misrecognized portion of the recognition result; and
  instructions for re-recognizing, in real time, at least a portion of the first plurality of strokes included in the digital ink input, taking into account a rewritten portion of the plurality of strokes, to produce a new recognition result, such that an attempt is made to correct a second misrecognized portion of the presented result when the second misrecognized portion exists, the second misrecognized portion corresponding to at least one of the first plurality of strokes not selected as corresponding to the misrecognized portion of the presented result, wherein
  the machine-readable storage device is either a machine-readable memory or a machine-readable static storage device.

8. The machine-readable storage device of claim 7, wherein the instructions for making a rewriting feature discoverable further comprise:
  instructions for displaying a rewrite message when a pointing device hovers over the selected at least one of the plurality of strokes corresponding to the misrecognized portion of the recognition result.

9. The machine-readable storage device of claim 7, wherein the instructions further comprise:
  instructions for presenting at least one alternate recognition result, as a result of receiving the selection indicating at least one of the first plurality of strokes corresponding to the misrecognized portion of the recognition result.

10. The machine-readable storage device of claim 7, wherein the instructions further comprise:
  instructions for presenting at least one first alternate recognition result, as a result of receiving the selection indicating at least one of the first plurality of strokes corresponding to the misrecognized portion of the recognition result;
  instructions for presenting at least one second alternate recognition result, as a result of receiving a selection indicating one of the at least one first alternate recognition result, the presented at least one second alternate recognition result having a same structure as the presented at least one first alternate recognition result; and
  instructions for correcting the presented recognition result based on a selected one of the at least one second alternate recognition result.

11. The machine-readable storage device of claim 10, wherein the instructions for correcting the presented recognition result based on a selected one of the at least one second alternate recognition result further comprise:
  instructions for re-recognizing the digital ink input taking into consideration the selected one of the at least one second alternate recognition result.

12. The machine-readable storage device of claim 7, wherein the two dimensional structure includes a mathematical expression.

13. The machine-readable storage device of claim 7, wherein the instructions further comprise:
  instructions for receiving the first plurality of strokes of the digital ink via an ink input window presented on a display screen; and
  instructions for growing the ink input window as a portion of one of the first plurality of strokes approaches an edge of the ink input window.

* * * * *